T. R BROWN.
AUTOMATIC TRAIN LINE COUPLING.
APPLICATION FILED JULY 14, 1914.
1,226,612.
Patented May 15, 1917.
3 SHEETS—SHEET 1.
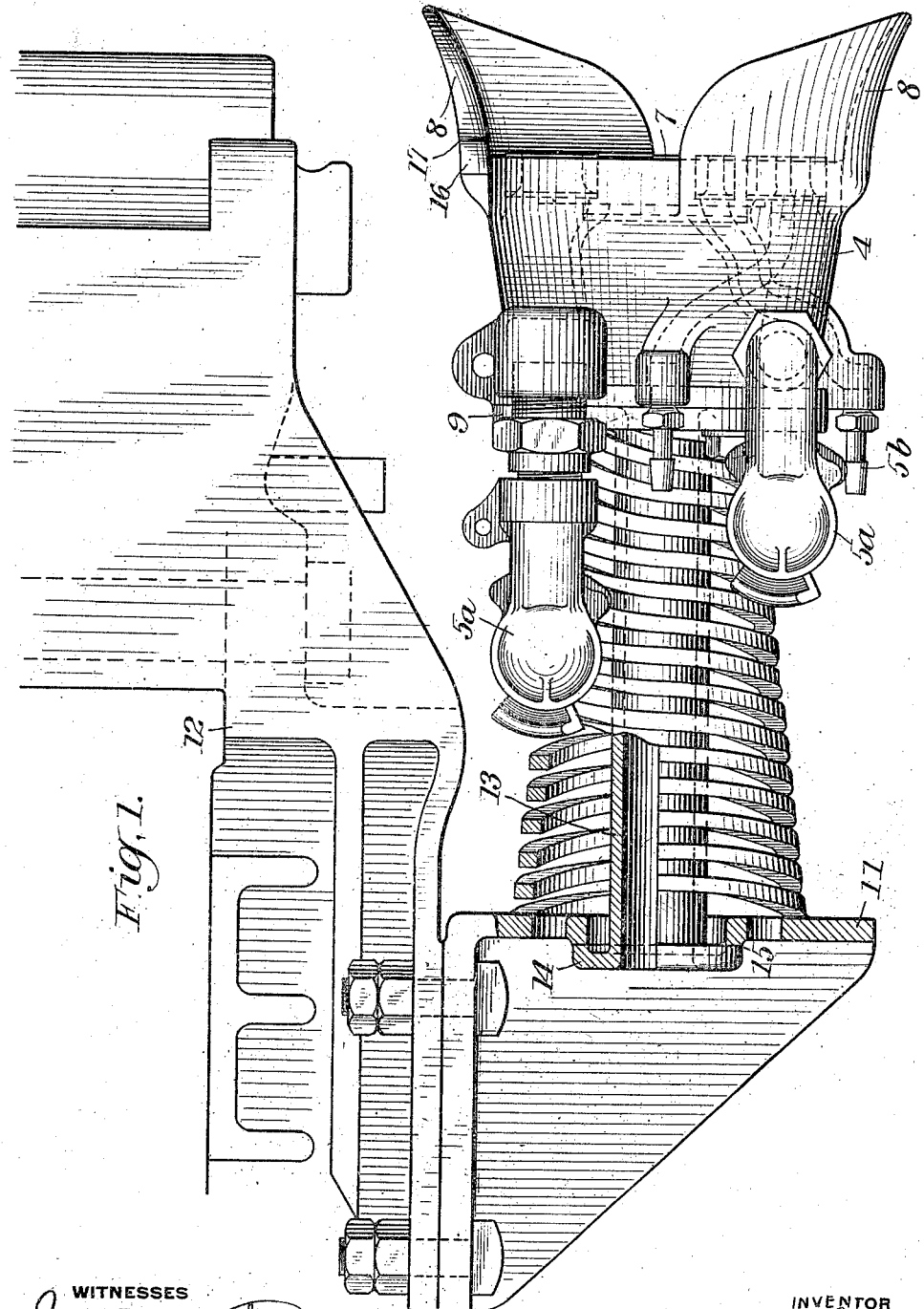

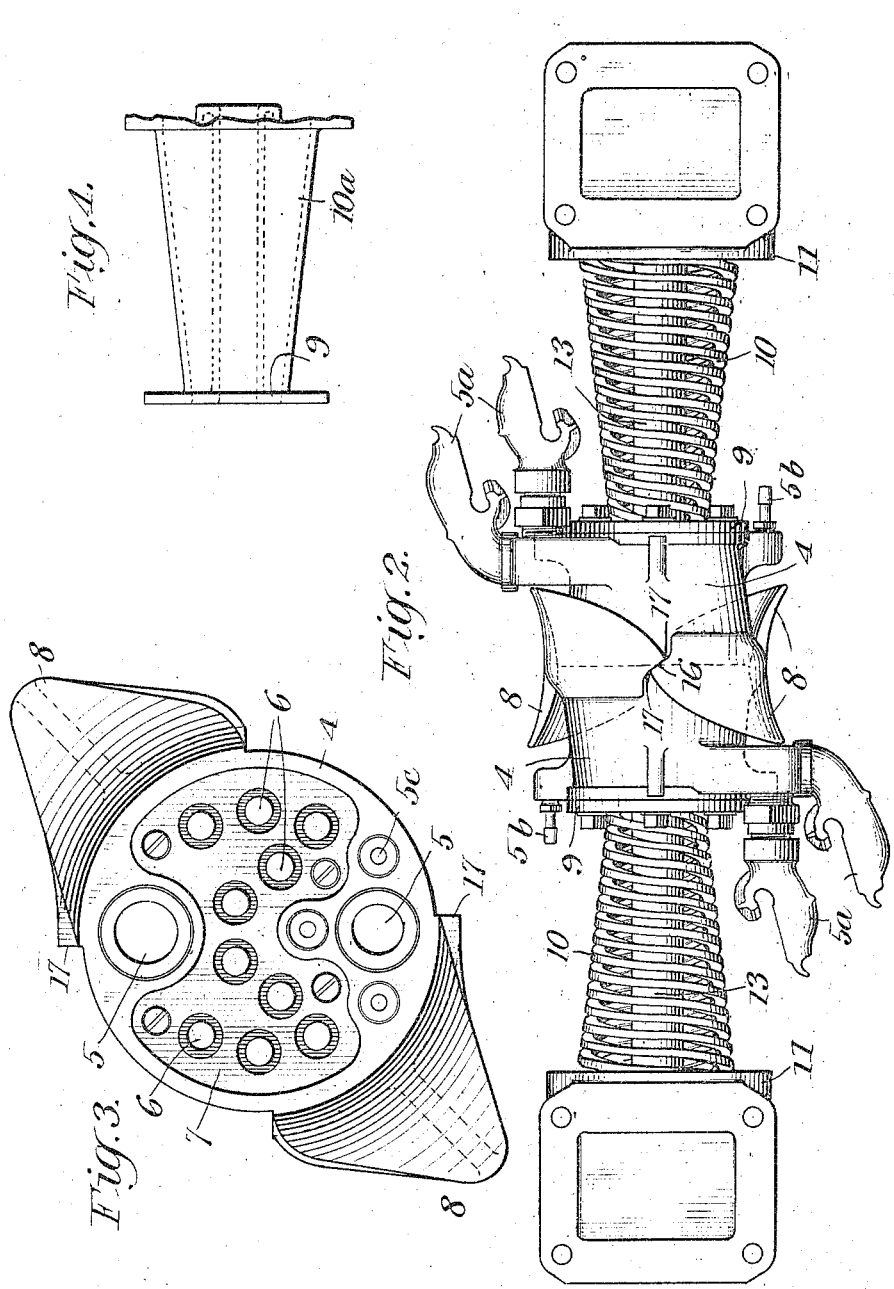

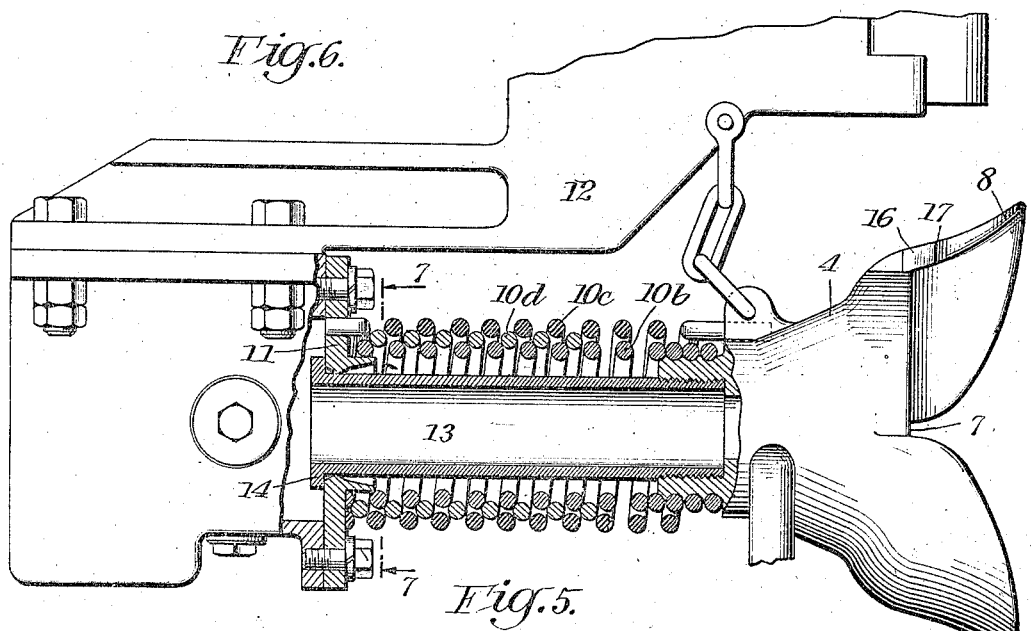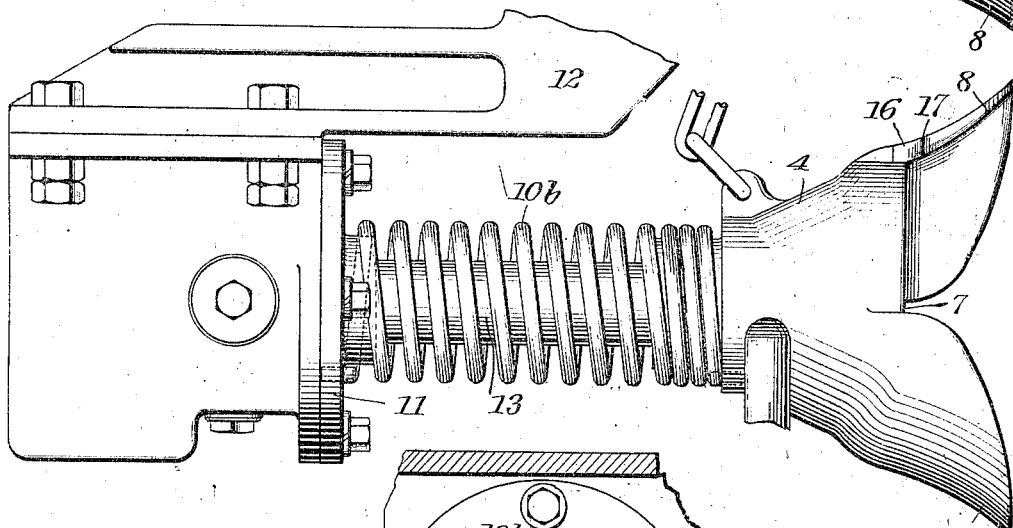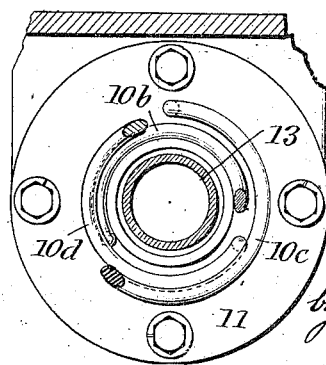

UNITED STATES PATENT OFFICE.

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

AUTOMATIC TRAIN-LINE COUPLING.

1,226,612.  Specification of Letters Patent.  Patented May 15, 1917.

Application filed July 14, 1914. Serial No. 850,988.

*To all whom it may concern:*

Be it known that I, THOMAS R. BROWN, a citizen of the United States, and a resident of Sparkill, in the county of Rockland and State of New York, have invented a certain new and useful Improvement in Automatic Train-Line Couplings, of which improvement the following is a specificatic.

This invention relates to automatic couplings for connecting fluid pressure conduits and electric circuits between the cars or other vehicles of a train, one of the objects being to provide a coupling of the butt type with improved means for interlocking the counterpart coupler heads when brought together in the act of coupling, whereby the same are held together by a relative rotary movement between said coupler heads.

Another object is to provide the method of manufacture of such couplings in which the coupler head is supported by a coiled spring from a hanger plate or bracket, whereby the supporting plate, the coiled spring, and the coupler flange, or portion of the coupler casing supported by the spring, may be formed in one integral structure.

In the accompanying drawings: Figure 1 is a side elevation of one form of coupling embodying my improvement, a portion of the coiled spring and the bracket being indicated in vertical section; Fig. 2, a plan showing two counterpart couplings coupled together; Fig. 3, a face view of one of said couplers; Fig. 4, an elevation of the integral casting before the springs are cut; Fig. 5, a side elevation showing a modified form of coiled spring; Fig. 6, a vertical longitudinal section showing a further modification in which a plurality of coiled springs are employed; and Fig. 7, a transverse section taken on the line 7—7 of Fig. 6.

According to the construction shown in the drawings, the coupling comprises a coupler head, 4, having openings, 5, provided with gaskets for fluid pressure conduits, and electric contacts, 6, mounted in the face, 7, of said head, which is also provided with outwardly projecting arms, 8, for engaging the corresponding arms of the counterpart coupler head for directing the heads into the proper engagement with each other in coupling. The head, 4, is preferably bolted to a flange or plate 9, supported by the coiled spring 10, which is in turn supported by the hanger plate or bracket, 11, bolted to the draw bar or car coupler, 12. A tubular shank or guide member, 13, extends from the coupler flange, 9, through the axis of the coiled spring and through an opening in the bracket, 11, where it is provided with a flange, 14, for engaging the rear face of the bracket plate and thereby limit the outward movement of the coupler heads and prevent stretching of the springs when the heads are pulled apart in uncoupling.

The coiled spring, 10, is preferably tapered toward the outer end and is rigidly secured at that end to the plate or portion, 9, of the coupler head while the inner end is rigidly secured to the hanger or bracket plate, 11. According to my improved method these parts are formed in one integral structure by first forming a steel casting comprising said flanges or plates connected by a continuous tapered shell, 10$^a$, of the desired contour of the spring, as shown in Fig. 4, and then cutting one or more helical slots in said shell between the adjacent coils, thus leaving one or more continuous tapered helical coils formed integral with the respective flanges at their opposite ends, the casting being made of such a grade of steel that the spring shall have the desired resiliency. The central tubular guide member, 13, may also be cast integral with the flange, 9, and bracket, 11, its flange, 14, being afterward cut apart from the bracket along the surface, 15. By this method the spring connections are made secure and permanent, and it is only necessary to attach the coupler head to the front flange.

The outwardly flaring and tapered arms, 8, project forward upon opposite sides of the face of each coupler head, one at the right above the center and the other at the left below the center, whereby when the two counterpart couplers are brought together in coupling, the engaging arms serve to guide the heads properly and direct the faces into a butt contact with each other. In order that the coupler heads may be interlocked in the closed position one of the flaring edges of the arm, 8, is formed with a surface, 16, inclined at an angle to the coupler face, and has a projection, 17, extending laterally beyond the vertical center line of the coupler face, whereby the corresponding edges of the projecting arms of the counterpart coupler heads engage each other in the act of coupling and cause a relative rotary movement between said heads, which action subjects the supporting coiled springs to a torsional stress; then as the projecting points, 17, of said edges pass each other, the inclined surfaces, 16, come into engagement with each other, and the torsional force stored in the springs reacts to turn the heads in opposite directions, and force the same into close contact with each other, by means of the engaging inclined surfaces. In this way the heads are yieldingly interlocked and there is a certain amount of rubbing action upon the electric contacts which tends to keep the same clean and bright.

The fluid pressure openings, such as 5, may communicate by suitable passages through the head, 4, with hand couplers, 5$^a$, to which the flexible hose of train pipe lines, such as the brake pipe and signal pipe, may be connected, and other fluid pressure lines may be connected to nipples, 5$^b$, communicating with the smaller openings, 5$^c$, in the face of the couplers, while the electric contacts are connected to respective circuit wires leading through the tubular guide member, 13.

When the coupler heads are pulled apart in uncoupling, the flange, 14, of the central guide engages the bracket and the coupler heads pulling against each other through the surfaces, 16, produce a relative rotary movement of the heads sufficient for the edges, 17, to clear each other and permit the separation of the coupler heads.

According to the modification shown in Fig. 5, the coiled spring, 10$^b$, is formed in a separate piece rigidly secured at its opposite ends to the bracket plate, 11, and the coupler head, 4, the latter connection being made by winding the end coils of the spring close together and screwing the same onto the threaded shank of the coupler head.

A plurality of coiled springs may be employed, if desired, as shown in Fig. 6, in which coiled spring, 10$^c$, is located outside of spring, 10$^b$, and is also attached at its ends to the bracket and coupler head respectively to provide additional resistance to the torsional or twisting movement of the coupler head. In order to give greater stiffness to the spring at its base, an additional coiled spring, 10$^d$, may be wound in between the springs, 10$^b$, and 10$^c$, and extend out a part of the distance from the bracket toward the coupler head. The interlocking movement of the coupler heads, due to the engaging arms, 8, surfaces, 16, and the torsional force of the coiled spring is substantially the same in all of the modifications.

With reference to the form of connecting shell employed in the process of manufacture, it will be apparent that, if preferred, portions of the slots may be formed therein when making the casting, and the remaining connecting ribs may then be cut away to complete the helical slots and separate the adjacent coils of the spring.

Having now described my invention, what I claim as new and desire to secure by Letters Patent is:

1. In an automatic coupling of the butt type, the combination of a hanger plate adapted to be suspended from the draw bar, a coupler head having outwardly projecting arms, and a coiled spring formed integral with the hanger plate and a portion of the coupler head.

2. In an automatic coupling of the butt type, the combination of a hanger plate, a coiled spring formed integral with said hanger plate at one end, a flange formed integral with said spring at its other end, and a coupler head secured to said flange and having outwardly projecting arms.

3. In an automatic coupling of the butt type, the combination of a hanger plate, a coiled spring supported thereby, a flange plate supported by said spring, a coupler head secured to said flange, and a guide member extending from said flange through the hanger plate, said hanger plate, coiled spring, flange, and guide being formed in one integral structure.

4. In an automatic coupling of the butt type, the combination of a hanger plate, a coiled spring rigidly secured thereto at one end, and a coupler head rigidly secured at the other end of said spring and having outwardly extending arms, said arms being formed to coöperate with corresponding arms of a counterpart coupler, to produce a relative rotary movement of said heads in the act of coupling.

5. In an automatic coupling of the butt type, the combination of a hanger plate, a coiled spring rigidly secured thereto at one end, a coupler head rigidly secured at the other end of said spring, means for producing a relative rotary movement of the counterpart heads in the act of coupling, and interlocking projections having inclined engaging surfaces for forcing said heads into close contact.

6. In an automatic coupling of the butt type, the combination of a hanger plate, a coiled spring rigidly secured thereto at one end, and a coupler head rigidly secured at the other end of said spring and having outwardly extending arms, said arms being formed to coöperate with corresponding arms of a counterpart coupler, to produce a relative rotary movement of said heads, and having interlocking projections provided with inclined surfaces.

In testimony whereof I have hereunto set my hand.

THOMAS R. BROWN.

Witnesses:
A. M. CLEMENTS,
S. W. KEEFER.